United States Patent Office 3,427,126
Patented Feb. 11, 1969

3,427,126
PREPARATION OF WATER-INSOLUBLE SULPHIDES
Livio Cambi, Largo Rio de Janeiro 5, Milan, Italy
No Drawing. Filed June 26, 1964, Ser. No. 378,444
Claims priority, application Italy, July 1, 1963,
13,691/63
U.S. Cl. 23—138                                   1 Claim
Int. Cl. C01g 9/08

ABSTRACT OF THE DISCLOSURE

This invention relates to the preparation of water-insoluble sulphides by the reaction of the corresponding oxides or oxygen-containing salts with sulphur in liquid water at temperatures of about 180–370° C., and pressures of about 10–250 atmospheres.

---

It has long been known that metallic oxides will react with sulphur to produce the corresponding sulphides. For example, Forster (Poggendorfs Annalen 1863, pp. 228, 248) reacted sulphur with strontium and barium oxides, or the corresponding carbonates, in order to obtain luminescent strontium and barium sulphides. His method involved heating the reagents in the dry condition in a crucible. The process may be represented by the following equation:

$$4S + 4MO \rightarrow 3MS + MSO_4$$

where M is strontium or barium.

It has also been proposed to prepare pyrites ($Fe_2S$) by heating iron filings in the presence of water in a closed tube at 200° C. with powdered sulphur and hydrogen sulphide. Similarly, a variety of sulphur-containing reagents react with ferrous-salts in the presence of water under pressure with the formation of pyrites.

It has now been found that water-insoluble sulphides may quite generally be prepared by heating a compound of an element which forms a water-insoluble sulphide with sulphur and liquid water at a temperature from 180–370° C. under a pressure from 10–250 atmospheres. Ordinarily, the oxide of the metal whose sulphide is required is used, and in such a case the reaction which takes place may be represented as follows:

$$4Me^{II}O + 4S \rightarrow 3Me^{II}S + Me^{II}SO_4$$
$$4Me_2^{III}O_3 + 12S \rightarrow 3Me_2^{III}S_3 Me_2^{III}(SO_4)_3$$

where $Me^{II}$ and $Me^{III}$ are a divalent and trivalent metal or metalloid respectively. The water apparently catalyses the reaction in accordance with the equation:

$$4S + 4H_2O \rightarrow 3H_2S + H_2SO_4$$

The hydrogen sulphide and sulphuric acids are, of course, immediately converted into the corresponding sulphide and sulphate, and it cannot be said with any certainty whether they can be regarded as having any separate existence.

It will be noted that one equivalent of sulphate is produced for every three equivalents of sulphide, and it is possible to make use of this fact by including in the reaction mixture a third of an equivalent of an oxide or carbonate of an alkali or alkaline earth metal for every equivalent of the oxide of the element forming a water-insoluble sulphide. If this is done, the water-insoluble sulphide is formed in association with a sulphate of an alkali or alkaline earth metal. In order that the sulphate shall be readily separable from the sulphide, it is ordinarily preferred to use an oxide or carbonate of sodium or magnesium, e.g. sodium carbonate or magnesium oxide. If this is done, the sulphate can readily be separated from the sulphide by washing.

The invention is particularly advantageously applied in the production of zinc sulphide of pigmentary quality. The reaction may be represented as follows:

$$4ZnO + 4S \rightarrow 3ZnS + ZnSO_4$$

It is preferred to carry out the reaction in an autoclave at from 250–350° C. and at a pressure up to 150 atmospheres. It is found that at 265° C., commercial zinc oxide is 85% converted in four hours, fifteen minutes, whereas at 345° C., the same degree of conversion is attained in two hours and a quarter.

As already mentioned, the reaction may be carried out in the presence of an oxide or carbonate of an alkali or alkaline earth metal, and this has the advantage, not only of eliminating waste of the zinc oxide starting material as zinc sulphate, but also of promoting the speed of the reaction. Thus, the presence of sodium carbonate or magnesium oxide accelerates the reaction by up to as much as five times.

It will be appreciated that the crystalline form and degree of purity of the starting materials used affect the rate of the reaction and the quality of the sulphide product obtained. It is generally preferred to use hydrated zinc oxide rather than the anhydrous material as starting material in order that the maximum rate of reaction shall be obtained.

The process of the invention may be adapted to afford a method for separating mixtures of oxides. The mixture is subjected to the reaction with sulphur and water under pressure, the amount of sulphur being calculated so that it is sufficient only to react with the oxide of the element having the greater affinity for sulphur. The oxide of the other element is transformed into the corresponding sulphate, or, if an oxide or carbonate of an alkali or alkaline earth metal is present, it remains unchanged.

The reaction may also advantageously be adapted for the production of mixtures of sulphides by reacting mixtures of oxides with sulphur and water. Thus, for example, argyrodite can be obtained by the simultaneous reaction of silver oxide and germanium dioxide with sulphur and water. Other naturally occurring mixed sulphides can be synthesised in similar fashion, e.g. Canfieldite, sulpho-antimonites, sulpho-arsenites, sulpho-arsenates, sulpho-bismuthites, and sulpho-vanadates.

Of course, it is possible to carry out the reaction in the presence of an excess of the oxide so that a mixture of sulphide and oxide is finally obtained. This procedure may be of advantage if the presence of the oxide confers advantageous properties on the desired sulphide, e.g. for pigmentary purposes.

The following examples illustrate the invention.

Example I

One kilogram of commercial zinc oxide, 0.4 kilograms of powdered sulphur, and 30 litres of water are mixed and placed in an autoclave in which they are heated at 265° C., under a pressure of 50 atmospheres. The mixture is stirred continuously and after 5 hours a yield of 96% of zinc sulphide is obtained.

Example II

Proceeding as in Example I but at a temperature of 312° C. and under a pressure of a 100 atmospheres, a yield of 92.5% of zinc sulphide is obtained after 4 hours and a half.

Example III

Proceeding as in Example I but at a temperature of 343° C. and under a pressure of 150 atmospheres, a yield of 93.5% of zinc sulphide is obtained after 4 hours.

Example IV

One kilogram of commercial zinc oxide, 0.540 kilogram of sulphur, 0.170 kilogram of calcined magnesium oxide and 30 litres of water are mixed and then heated with stirring in an autoclave at 312° C. under a pressure of 100 atmospheres. After 2 hours, a yield of 90% of zinc sulphide is obtained.

Example V

Proceeding as in Example IV but at a temperature of 343° C. and under a pressure of 150 atmospheres, a yield of 90% of zinc sulphide is obtained after 1 hour.

Example VI

One kilogram of commercial zinc oxide, 0.54 kilogram of sulphur and 0.45 kilogram of anhydrous sodium carbonate are mixed with 30 litres of water and heated in an autoclave at 212° C. under a pressure of 100 atmospheres. The mixture is stirred, and after 4 hours a yield of 93% of zinc sulphide is obtained.

Example VII

From 1 kilogram of arsenic trioxide, 0.41 kilogram of zinc oxide, 1.19 kilograms of magnesium oxide, processed in an autoclave at 265° C. and under a pressure of 50 atmospheres, the bright yellow, pigmentary, hitherto unknown, sulphosalt $ZnS.As_2S_5$ was obtained, after 1–2 hours stirring with a yield of 96%.

Example VIII

Proceeding as in Example VII, from 1 kilogram of antimony sesquioxide, 0.28 kilogram of zinc oxide, 0.60 kilogram of sulphur, 0.18 kilogram of magnesium oxide, the black, pigmentary mixture $ZnS.Sb_2S_3$ was obtained.

Example IX

Proceeding as in Example VII, from 1 kilogram of copper oxide, 0.68 kilogram of antimony sesquioxide, 0.60 kilogram of sulphur, 0.19 kilogram of magnesium oxide, the sulphosalt $3Cu_2S.Sb_2S_3$, identical with the natural tetrahedrites, was obtained in a microcrystalline form.

Example X

From 1 kilogram of copper oxide, 0.425 kilogram of vanadic anhydride, 0.80 kilogram of sulphur, 0.25 kilogram of magnesium oxide, processed in an autoclave with water at 312° C. and under a pressure of 100 atmospheres, the black, pure, sulphosalt $3Cu_2S.V_2S_5$, corresponding to the mineral "sulvanite," was obtained.

Example XI

From 1 kilogram of silver oxide (or else from the equimolecular quantity of silver chloride). 0.113 kilogram of germanium dioxide, 0.28 kilogram of sulphur, 0.09 kilogram of magnesium oxide, processed at a temperature of 265° to 312° C. and under a pressure of 50 to 100 atmospheres in the presence of water, the argyrodite $4 Ag_2S.GeS_2$ was produced with a practically quantitative efficiency.

With the processes indicated in the foregoing, more than 70 products (sulphides, sulphosalts, mixtures of sulphosalts) were obtained.

I claim:
1. Process for the production of zinc sulphide which comprises heating reactants consisting essentially of zinc oxide; sulphur and liquid water at a temperature from 180° C. to 370° C. under a pressure from 10–250 atmospheres.

References Cited

UNITED STATES PATENTS

| | | | |
|---|---|---|---|
| 1,142,795 | 6/1915 | Llopart | 23—125 |
| 1,849,453 | 3/1932 | Gaskill | 23—135 |
| 620,466 | 2/1899 | Lones | 23—135 |
| 1,013,511 | 1/1912 | Pipereaut et al. | 23—135 |
| 1,414,836 | 5/1922 | Stark | 23—136 |

FOREIGN PATENTS 1,593   4/1926   Australia.

OSCAR R. VERTIZ, *Primary Examiner.*

G. O. PETERS, *Assistant Examiner.*

U.S. Cl. X.R.

23—135